United States Patent [19]
Chiba et al.

[11] Patent Number: 5,354,161
[45] Date of Patent: Oct. 11, 1994

[54] CHECK BOOK ISSUING MACHINE

[75] Inventors: Hiroshi Chiba; Hideyuki Ebihara, both of Kawaguchi, Japan

[73] Assignee: Laurel Bank Machines Co., Ltd., Tokyo, Japan

[21] Appl. No.: 149,790

[22] Filed: Nov. 10, 1993

[30] Foreign Application Priority Data

Nov. 12, 1992 [JP] Japan .................................. 4-302292

[51] Int. Cl.⁵ ............................................. B42C 11/00
[52] U.S. Cl. ........................................... 412/9; 412/4; 412/11; 412/14
[58] Field of Search ........................ 412/1, 4, 9, 11, 14, 412/19

[56] References Cited

U.S. PATENT DOCUMENTS

| | | |
|---|---|---|
| 3,692,293 | 9/1972 | Peacock . |
| 4,196,846 | 4/1980 | Kao et al. . |
| 4,596,332 | 6/1986 | Gensike et al. . |
| 4,626,156 | 12/1986 | Baughman et al. ............... 412/4 |
| 4,906,026 | 3/1990 | Gordon, Jr. et al. . |
| 5,259,678 | 11/1993 | Uchida . |
| 5,261,769 | 11/1993 | Leclerc ................................ 412/4 |

FOREIGN PATENT DOCUMENTS

| | | |
|---|---|---|
| 115189 | 8/1984 | European Pat. Off. . |
| 441964 | 8/1991 | European Pat. Off. . |
| 2613286 | 10/1988 | France . |
| 2073661 | 10/1981 | United Kingdom . |
| 2141666 | 1/1985 | United Kingdom .............. 412/4 |

OTHER PUBLICATIONS

WO91/03799, Mar. 21, 1991, PCT/JP90/00493, Filed Apr. 16, 1990, Nakamura, Minoru et al "Printing Device of Securities" pp. 1-9 (See appln. p. 3).

*Primary Examiner*—Timothy V. Eley
*Assistant Examiner*—Willmon Fridie, Jr.
*Attorney, Agent, or Firm*—Cushman, Darby & Cushman

[57] ABSTRACT

A check book issuing machine including a check blank storing section for storing check blanks, a blank storing section for storing front covers, divider papers and back covers, take-out means for taking out blanks from the storing sections in an order such as a front cover, seven check blanks, a divider paper, three check blanks and a back cover, a MICR character printer for printing print data consisting of MICR characters, a printer for printing predetermined data on the surfaces of the check blanks, a printed data reader for reading out data consisting of MICR characters printed on the surface of the check blanks, a blank stacker for stacking ten of checks, one front cover, one divider paper and one back cover therein.

36 Claims, 8 Drawing Sheets

CHECK BOOK ISSUING MACHINE

BACKGROUND OF THE INVENTION

The present invention relates to a check book issuing machine and, in particular, to such a machine which can print necessary data on checks, judge whether or not the data are properly printed and issue a check book including a plurality of checks.

DESCRIPTION OF PRIOR ART

For each customer to whom checks are to be issued, data such as the name of payer, place of payment, name of drawer, place of drawing, clearing house, name of bank, name of bank branch, account number and the like are printed on checks and the checks are delivered to the customer in the number the customer requires.

These data to be printed on checks usually include the data consisting of visually recognizable characters, numerals, symbols, figures or the like and data whose meanings cannot be understood (hereinafter referred to collectively as "visually unrecognizable data" in this Specification) and which consists of magnetic ink recognition characters, numerals, symbols or the like (referred to as "MICR characters" in this specification) or symbols such as barcode.

From the viewpoint of the nature of checks, errors in the printing of these data are totally inadmissible and, therefore, it is indispensable to judge after printing whether or not the data are exactly printed.

Although such judgment can be relatively easily made as to the data consisting of visually recognizable characters, numerals, symbols, figures or the like, since it is impossible to judge whether or not the visually unrecognizable data are exactly printed, unless they are read by an independent read-out apparatus after the check has been made out, it is troublesome to make such judgment.

For solving this problem, International Publication No. WO 91/03799 proposes a printing apparatus for checks in which check blanks are taken out one by one from a check blank storing section, data consisting of visually recognizable characters and numerals are printed on the check blank, visually unrecognizable data such as MICR characters and the like are printed, thereafter the visually unrecognizable data are read by a data read-out means so as to judge whether or not they are exactly printed and checks on which the data are exactly printed are stacked in a check storing section.

In this printing apparatus for checks, since the data read-out means is provided for reading the visually unrecognizable data, it is unnecessary after the check has been made out to have an independent read-out apparatus judge whether or not the visually unrecognizable data are exactly printed on the check. Therefore, in this apparatus, it is possible to very easily print data on the check blank and judge whether or not the visually unrecognizable data are exactly printed thereon.

However, since checks are used in the form of a check book made by binding a predetermined number of checks, it is necessary to take out a predetermined number of checks from among the checks made out by this check printing apparatus and stored in a check storing section and combine them so as to make a check book. The making of check books is troublesome.

SUMMARY OF THE INVENTION

It is, therefore, an object of the present invention to provide a check book issuing machine which can print necessary data on checks, judge whether or not the data are properly printed and issue a check book by binding a predetermined number of checks.

The above and other objects of the present invention can be accomplished by a check book issuing machine comprising a blank storing means for storing blanks including a plurality of check blanks, front covers and back covers, blank take-out means for taking out blanks stored in the blank storing means two or more times in an order such as a front cover, a predetermined number of check blanks and a back cover, thickness detecting means for detecting the thickness of the blanks taken out by the blank take-out means and outputting detection signals, read-out means for reading out the surface characteristics of the blanks taken out by the blank take-out means and outputting read-out signals, MICR character printing means for printing visually unrecognizable data consisting of MICR characters, printer means for printing visually recognizable predetermined data on the surfaces of at least the check blanks among said blanks, printed data read-out means for reading out data consisting of MICR characters printed on the surfaces of the check blanks by the MICR character printing means, blank stacking and transferring means for stacking a predetermined number of checks, one front cover and one back cover therein and holding the stacked checks, front cover and back cover for transferring them, staple means for binding one end portions of the predetermined number of check blanks, the one front cover and the one back cover stacked in and held between the blank stacking and transferring means, adhering means adapted for sticking an adhesive tape on the one end portions of the predetermined number of check blanks, the one front cover and the one back cover whose one end portions are bound by the stapler means and producing a check book, collecting box means for collecting blanks therein which are not suitable for being stacked in the blank stacking and transferring means, blank transporting means for transporting blanks between the blank storing means, the thickness detecting means, the read-out means, the MICR character printing means, the printer means and the printed data read-out means, and the blank stacking and transferring means and the collecting box means, fork means disposed among the printed data read-out means, the blank stacking and transferring means and the collecting box means and adapted for feeding the blanks to either the blank stacking and transferring means or the collecting box means, and control means for judging based upon the detection signals input from the thickness detecting means whether or not double feed of blanks occurs, judging based upon the read-out signals input from the read-out means whether or not a predetermined blank has been taken out, judging based upon the read-out signals input from the printed data read-out means whether or not print data consisting of the MICR characters have been printed on the check blanks by the MICR character printing means in a desired manner, driving the fork means to thereby feed to the collecting box double fed blanks, any blank other than a predetermined one and any check blank whose surface is not printed with the print data consisting of the MICR characters by the MICR character printing means in a desired manner, causing the blank stacking and transferring means to hold the predetermined number of check blanks, the one front cover and the one back cover when the predetermined number of check blanks, the one front cover and the one back cover have been stacked in the blank stacking and transferring means, causing the stapler means to bind one end portions of the predetermined number of check blanks, the one front cover and the one back cover held by the blank stacking and transferring means, causing the blank stacking and transferring means to transfer the predetermined number of check blanks, the one front cover and the one back cover to the adhering means, causing the adhering means to stick an adhesive tape on one edge portions thereof so as to produce a check book and causing the blank stacking and transferring means to feed out the thus produced check book into take-out box means.

In a preferred aspect of the present invention, the blanks further include a plurality of divider papers and the blank take-out means is adapted for taking out the blanks stored in the blank storing means two or more times in an order such as the front cover, a first predetermined number of check blanks, the divider paper, a second predetermined number of check blanks and the back cover.

In a further preferred aspect of the present invention, the blank storing means comprises first storing means for storing a plurality of check blanks and a second storing means for storing a plurality of front covers, divider papers and back covers.

In still another preferred aspect of the present invention, the blank stacking and transferring means comprises a support plate disposed in substantially the horizontal plane, a movable plate movable with respect to the support plate and a side plate having a surface substantially parallel to the transporting direction of blanks, and stacked blank aligning means is disposed below the support plate and adapted for projecting through an opening formed in the support plate to above the support plate so as to contact the lower surface of a fed-in blank and aligning the blank by moving it until it comes into abutment against the side plate.

In yet another preferred aspect of the present invention, the control means is adapted for causing the stacked blank aligning means to project through the opening to above the support plate when a blank is fed into the blank stacking and transferring means, retracting the same from the opening to below the support plate before the blank abuts against the blank stacking and transferring means and causing the stacked blank aligning means to project through the opening to above the support plate after the blank has passed through the opening.

In a still further preferred aspect of the present invention, the read-out means is adapted for reading out bar-code printed on the blanks and outputting read-out signals.

In yet another preferred aspect of the present invention, feed direction selector means is provided downstream of the printed data read-out means for changing the feed direction of blanks and the blank transporting means is adapted for transporting the blanks in substantially the horizontal direction between the blank storing means and the printed data read-out means, the feed direction selector means being adapted for transporting the blanks downwardly in substantially the vertical direction.

In a further preferred aspect of the present invention, the blank storing means is provided with front plate means and includes a stored blank aligning means adapted for applying vibration to the rear ends of the blanks stored in the blank storing means.

In still another preferred aspect of the present invention, unreceived check book collecting box means is provided below the take-out box means and the control means is adapted for causing the unreceived check book collecting box means to collect the check book in the unreceived check book collecting box means if the check book is not taken out from the take-out box means by the time that a predetermined time period has passed after the check book was fed into the collecting box means.

In yet another preferred aspect of the present invention, the blank stacking and transferring means can advance and retract and includes stopper means adapted for being positioned so as to abut against the predetermined number of check blanks, the one front cover and the one back cover held by the blank stacking and transferring means without interfering with the blank stacking and transferring means when the blank stacking and transferring means is retracted.

In a still further preferred aspect of the present invention, the printer means includes a dot printer.

The above and other objects and features of the present invention will become apparent from the following description made with reference to the accompanying drawings.

DESCRIPTION OF THE PREFERRED EMBODIMENT

Figure 1:
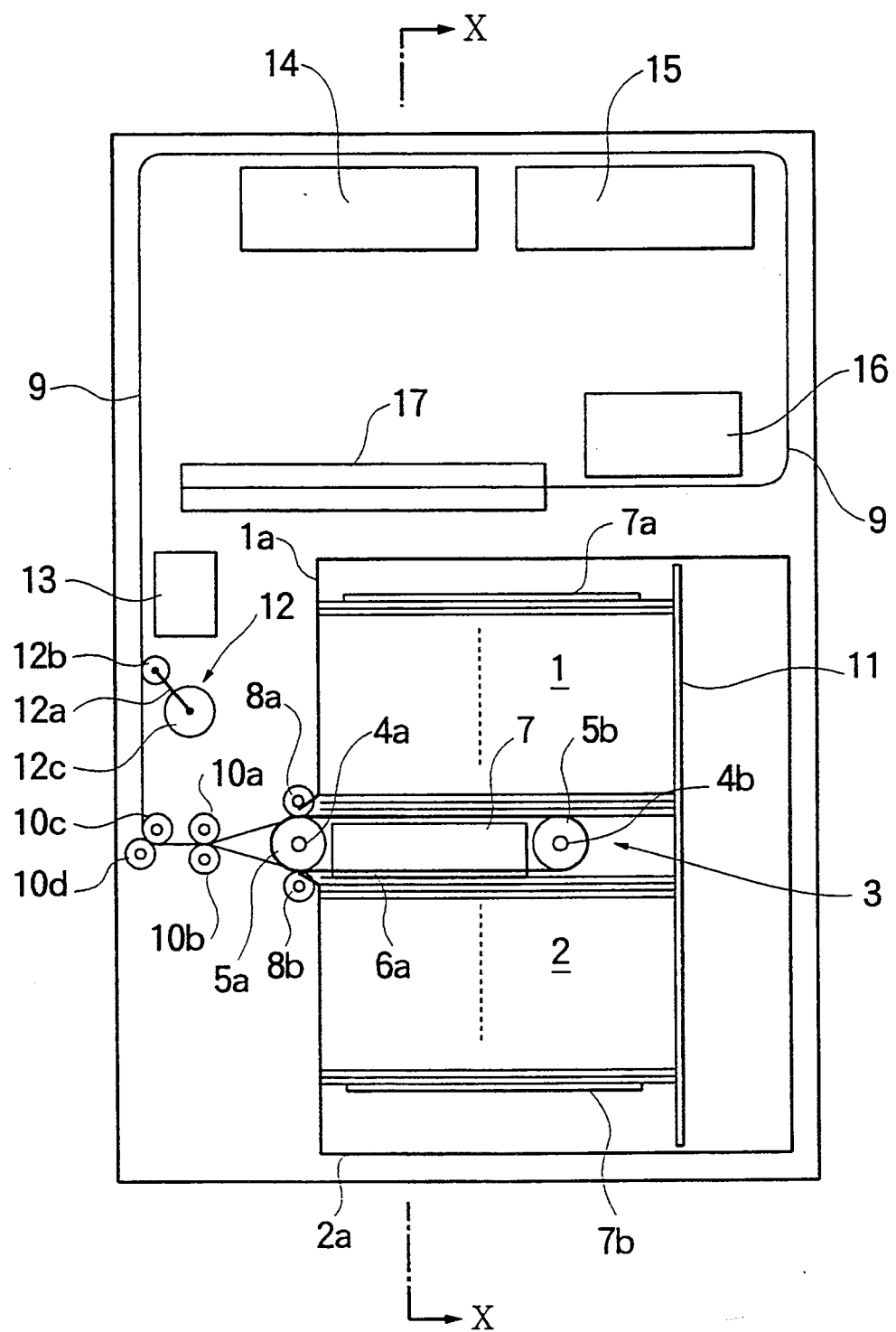
FIG. 1 is a schematic top plan view showing the internal mechanism of a check book issuing machine which is an embodiment of the present invention.
Figure 2:
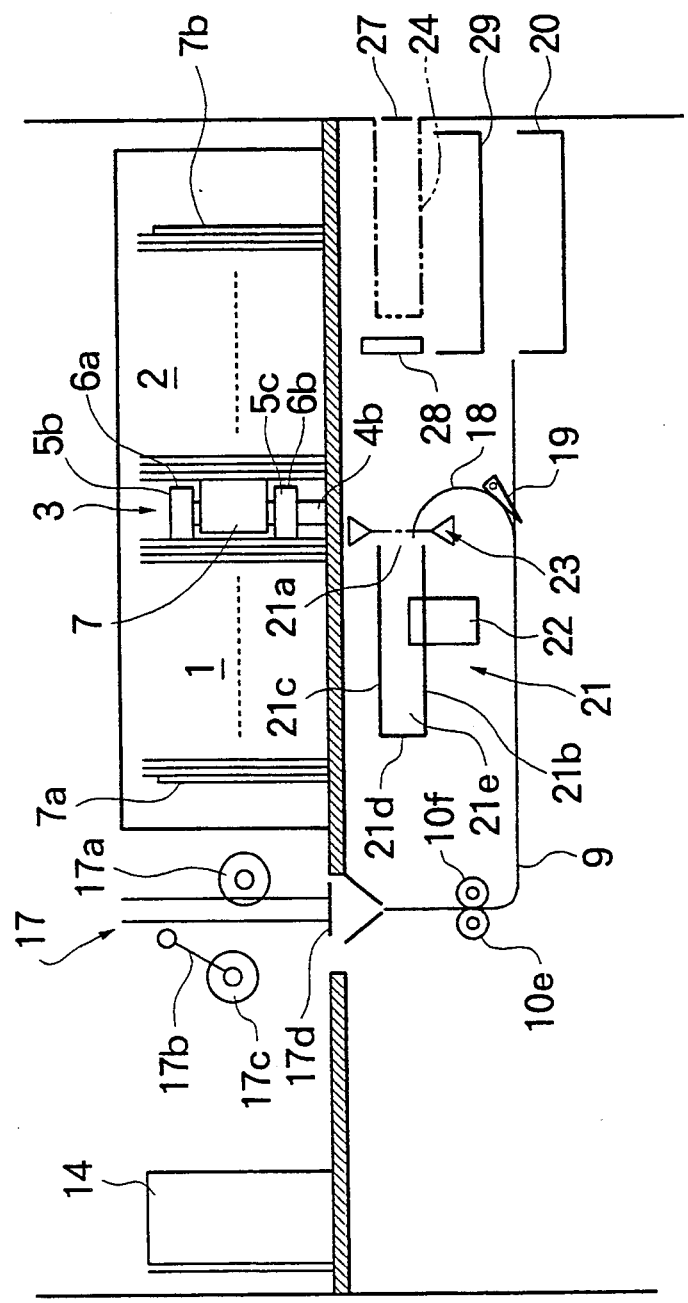
FIG. 2 is a schematic longitudinal view showing the internal mechanisms of a check book issuing machine which is an embodiment of the present invention.

Referring to FIGS. 1 and 2, a check book issuing machine which is an embodiment of the present invention is constituted so as to issue check books consisting of ten checks, a front cover, a back cover and a divider paper for indicating to a check book user that only three checks remain when seven checks have been used and comprises a first storing section 1 for storing check blanks, a second storing section 2 for storing front covers, back covers and divider papers and a take-out means 3 adapted for taking out the check blanks stored in the first check blank storing section 1, the front covers, the back covers and the divider papers stored in the second storing section 2. The first storing section 1 and the second storing section 2 are provided with front plates 1a, 1b respectively. The number of check blanks storable in the first storing section 1 and the number of front covers, back covers and divider papers storable in the second storing section 2 are substantially the same.

As shown in FIG. 2, the check blanks are stored upright in the first storing section 1 and the front covers, divider papers and back covers are stored upright in the second storing section 2 in sets consisting of one of each arranged in the order mentioned. The take-out means 3 comprises two pulleys 5a (only one shown in FIG. 1) fixed to a vertical shaft 4a so as to be spaced from each other in the vertical direction, two pulleys 5b, 5c fixed to a vertical shaft 4b so as to be spaced from each other in the vertical direction, an endless belt 6a wound around the pulley 5a fixed to the shaft 4a and the pulley 5b fixed to the shaft 4b, an endless belt 6b wound around the pulley (not shown) fixed to the shaft 4a and the pulley 5c fixed to the shaft 4b and a switching means 7 laterally slidably disposed between the shaft 4a and the shaft 4b for selectively separating the check blanks stored in the first storing section 1 or the front covers, back covers and divider papers stored in the second storing section 2 from the endless belts 6a, 6b. The vertical shaft 4a and the vertical shaft 4b are selectively and synchronously rotated clockwise or counterclockwise by a motor (not shown).

A plate-like press member 7a is provided in the first storing section 1 for pressing stored check blanks against the take-out means 3 and a plate-like press member 7b is provided in the second storing section 2 for pressing the stored front covers, divider papers and back covers against the take-out means 3. When the switching means 7 is slid toward the check blanks, the check blanks are pushed away from the endless belts 6a, 6b against the pressing force of the press member 7a and when the shaft 4a and the shaft 4b, namely, the pulleys 5a, 5b, 5c, are rotated by the motor (not shown) clockwise in FIG. 1, a front cover, divider paper and back cover are taken out of the second storing section 2 by the endless belts 6a, 6b. On the other hand, when the switching means 7 is slid toward the front covers, divider papers and back covers, they are pushed away from the endless belts 6a, 6b against the pressing force of the press member 7b and when the shaft 4a and the shaft 4b, namely, the pulleys 5a, 5b, 5c, are rotated by the motor (not shown) counterclockwise in FIG. 1, a check blank is taken out of the first storing section 1 by the endless belts 6a, 6b. In this manner, the check blanks stored in the first storing section 1 and the front covers, divider papers and back covers stored in the second storing section 2 are selectively taken out in accordance with the direction in which the switching means 7 is slid. The switching means 7 is slid by a switch drive means (not shown) and the switch drive means is controlled by a control unit (not shown) so that when a first switch signal is input from the control unit, the switching means 7 is slid toward the check blanks and when a second switch signal is input from the control unit, the switching means 7 is slid toward the front covers, divider papers and back covers.

A pair of separation rollers 8a and a pair of separation rollers 8b (only one of each pair shown in FIG. 1) is disposed on the opposite sides of and in contact with the pulleys 5a fixed to the shaft 4a for preventing double feed of the check blanks, the front covers, the divider papers and the back covers (referred to collectively as "blanks" in this specification). The separation rollers 8a, 8b are normally rotated synchronously with the two pulleys 5a fixed to the shaft 4a in the same direction as the pulleys 5a. A transporting passage 9 is connected to the downstream portion of the two pulleys 5a fixed to the shaft 4a and the separation rollers 8a, 8b. Transporting rollers 10a, 10b are provided in the transporting passage 9 downstream of the separation rollers 8a, 8b and transporting rollers 10c, 10d are provided in the transporting passage 9 downstream of the transporting rollers 10a, 10b. Each of the transporting rollers 10a, 10b, 10c, 10d can be rotated at higher speed than the pulleys 5a, 5b, 5c for enabling the check blanks, the front covers, the divider papers and the back covers to be transported at high speed. As a result, since a higher tensile force acts on the check blanks, the front covers, the divider papers and the back covers being taken out, torque limiters (not shown) are mounted on the separation rollers 8a, 8b, whereby when a torque of greater than a predetermined magnitude is produced on the separation rollers 8a, 8b by a check blank, front cover, divider paper and back cover, the separation rollers 8a, 8b are rotated in the direction enabling the check blank, front cover, divider paper or back cover to be transported to the transporting passage 9 without damage. Although the transporting passage 9 is provided with a plurality of transporting rollers and transporting belts in addition to the transporting rollers 10a, 10b, 10c, 10d shown, they are omitted from the drawings for simplicity.

A plate-like first aligning member 11 is provided on the side of the shaft 4a opposite from the first storing section 1 and the second storing section 2. The first aligning member 11 is adapted to be vibrated by a motor (not shown) after the check blanks, the front covers, the divider papers and the back covers have been set in the first storing section 1 and the second storing section 2 so as to tap the rear ends of the check blanks, the front covers, the divider papers and back covers and cause their front ends to abut against the front plates 1a, 2a. As a result, the ends of the check blanks, the front covers, the divider papers and the back covers are aligned to ensure that they can be smoothly taken out.

In the transporting passage 9 downstream of the transporting rollers 10c, 10d, the check blanks, the front covers, the divider papers and the back covers are transported as pressed onto the surface of the transporting passage 9 by the transporting rollers and transporting belts (not shown).

A thickness detecting means 12 is provided in the transporting passage 9 downstream of the transporting rollers 10c, 10d. The thickness detecting means 12 comprises a roller 12b rotatably mounted on one end of an arm 12a biased toward the surface of the transporting passage 9 by a spring (not shown) and a rotary encoder 12c for swingably supporting the other end of the arm 12a and detecting the amount of swing of the arm 12a and is adapted for detecting the displacement of the roller 12b caused by the check blanks, the front covers, the divider papers and the back covers passing between the roller 12b and the surface of the transporting passage 9, namely, the amount of swing of the arm 12a, and outputting a detection signal to the control unit (not shown). Based upon the detection signal, the control unit judges whether or not double feed of blanks has occurred and collects the blanks into a collecting box described later when it judges that double feed of blanks has occurred.

In the transporting passage 9 downstream of the thickness detecting means 12, a barcode reader 13 is provided for reading out barcode printed on the check blanks, the front covers, the divider papers and the back covers and outputting a read-out signal to the control unit (not shown). Based upon the read-out signal, the control unit discriminates the kind of the blank and judges whether or not a desired blank has been fed. When the control unit judges that the desired blank has not been fed, it collects the blank into a collecting box described later.

A MICR character printing section 14 is provided in the transporting passage 9 downstream of the barcode reader 13, for printing MICR characters on a predetermined portion of the check blank. The MICR character printing section 14 comprises a rotatable printing roller on which the MICR characters are engraved and a press member. A ribbon impregnated with magnetic ink is wound around the printing roller. When the control unit judges based upon a detection signal from a first photosensor (not shown) and the read-out signal from the barcode reader 13 that a check blank has been fed to the MICR character printing section 14, it actuates the press member to press the check blank, thereby printing the MICR characters on the blank. Since the configuration of the MICR character printing section 14 is well known, it is not shown.

A dot printer 15 is provided in the transporting passage downstream of the MICR character printing section 14 for printing predetermined data consisting of visually recognizable characters and numerals on a predetermined portion of the surface of the blanks. When the control unit (not shown) judges based upon a detection signal from a second photosensor (not shown) that a check blank, front cover, divider paper or back cover has been fed to the dot printer 15, it actuates the dot printer 15, thereby printing a predetermined data consisting of visually recognizable characters and numerals on a predetermined portion of the surface of the check blank, the front cover, the divider paper or the back cover. The dot printer 15 is movable along a guide member (not shown) extending along the transporting passage 9. Since the configuration of the dot printer is well known, it is not shown.

A read-out section 16 is provided in the transporting passage downstream of the dot printer 15 for reading out the printed data consisting of the MICR characters printed on the check blank and comprises a magnetizing head for magnetizing the MICR characters and a read-out head for reading out the magnetized printed data (neither shown). The read-out signal produced when the read-out head of the read-out section 16 reads out the data is input to the control unit (not shown) and when the control unit judges based upon the read-out signal that the printed data consisting of the MICR characters have not been printed on the check blank in the desired manner, it collects the check blank into the collecting box. Since the configuration of the read-out section 16 is well known, it is not shown. A third photosensor (not shown) is provided in the transporting passage 9 immediately upstream of the read-out section 16.

In the transporting passage 9 downstream of the read-out section 16, a feed direction selector section 17 is provided for changing the feed direction of the check blanks, the front covers, the divider papers and the back covers. The feed direction selecting section 17 is adapted for changing the transporting direction of the blanks which have been taken out from the first storing section 1 or the second storing section 2 and fed in substantially the horizontal plane to substantially the vertical direction and feeding the blanks downwardly. The check book issuing machine which is an embodiment of the present invention is divided into an upper mechanism and a lower mechanism by the feed direction selector section 17. As shown in FIG. 2, the feed direction selector section 17 comprises a rotatable stationary roller 17a, a swingable arm 17b one end of which is supported by the body of the check issuing machine, a movable roller 17c rotatably supported by the other end of the arm 17b and a shutter 17d disposed at the bottom portion thereof. When the control unit (not shown) judges based upon a detection signal from the third photosensor (not shown) that a check blank, front cover, divider paper or back cover has been received in the feed direction selecting section 17, it outputs a drive signal to a turning section drive means (not shown) and swings the arm 17b, thereby holding the check blank, front cover, divider paper or back cover between the movable roller 17c and the stationary roller 17. Thereafter, the shutter 17d is opened by the drive means so that the fixed roller 17a and the movable roller 17c are rotated, thereby feeding out the check blank, front cover, divider paper or back cover into the transporting passage 9 extending downwardly via the shutter 17d.

The check blank, front cover, divider paper or back cover fed out from the shutter 17d is held between transporting rollers 10e, 10f provided in the transporting passage 9 so as to be fed downwardly along the transporting passage 9 and is further fed to a reverse C shaped guide member 18 by a transporting belt (not shown).

A collecting fork 19 is provided immediately upstream of the guide member 18. The collecting fork 19 is driven by a fork drive means (not shown) and is adapted for collecting into the collecting box 20 two or more blanks which were judged to be simultaneously taken out from the first storing section 1 or the second storing section 2 based upon a detection signal from the thickness detecting means 12, blanks which were judged not to be of the kind intended to be taken out based upon a read-out signal from the barcode reader 13, check blanks which, based upon a read-out signal from the read-out section 16, were judged not to have had the printed data consisting of the MICR characters to be printed by the MICR character printing section 13 printed in a desired manner and blanks which have been taken out from the second storing section 2 until a desired blank is taken out from the second storing section 2 when it was judged based upon the detection signal from the thickness detecting means 12 that two or more blanks stored in the second storing section 2 were simultaneously taken out or when a blank other than the desired blank was taken out from the second storing section 2. A fourth photosensor (not shown) is provided at a portion immediately upstream of the collecting fork 19 for detecting such blanks.

Blanks not to be collected into the collecting box 20 are further fed along the transporting passage 9 and are stacked in a blank stacking section 21 via an opening 21a.

The blank stacking section 21 comprises a support plate 21b disposed at its lower portion, a movable plate 21c disposed above the support plate 21b and movable vertically, an end plate 21d extending substantially perpendicularly to the feed direction of the check blanks, the front covers, the divider papers and the back covers and disposed at the downstream ends of the support plate 21b and the movable plate 21c, and a side plate 21e extending substantially parallel to the feed direction of blanks and disposed on the one side of the support plate 21b and the movable plate 21c so as to be spaced from them by a predetermined interval. The side plate 21e extends substantially parallel to the feed direction of blanks from a portion in the vicinity of the end plate 21d to the opening 21a and terminates a predetermined distance before the opening 21a. The movable plate 21c is adapted for being lowered to hold the blanks between itself and the support plate 21b when a predetermined number of blanks have been stacked in the blank stacking section 21. The support plate 21b and the movable plate 21c are adapted for holding blanks therebetween and being movable substantially horizontally in the direction away from the end plate 21d. Further, a part of the support plate 21b is blanked with an opening 21f. Below the opening 21f is disposed a second aligning member 22 comprising a movable pulley 22a movable vertically, a stationary pulley 22b and an endless belt 22c wound around the movable pulley 22a and the stationary pulley 22b. A part of the movable pulley 22a and the endless belt 22c are adapted for projecting into the internal space of the blank stacking section 21 through the opening 21f. Further, a sixth photosensor 23 is provided immediately upstream of the opening 21a of the blank stacking section 21 and outputs a detection signal to the control unit (not shown).

Figure 3:
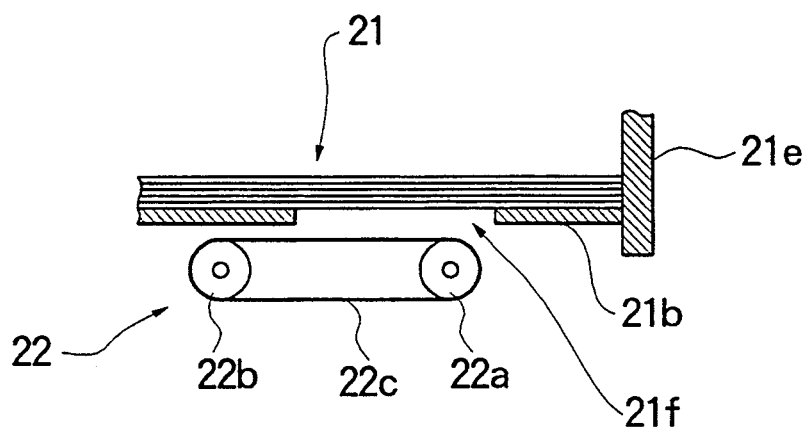
FIG. 3 is a schematic drawing showing a cross sectional view of a blank stacking section taken along a line perpendicular to the feed direction of blanks and also showing a second aligning member positioned below a support plate.
Figure 4:
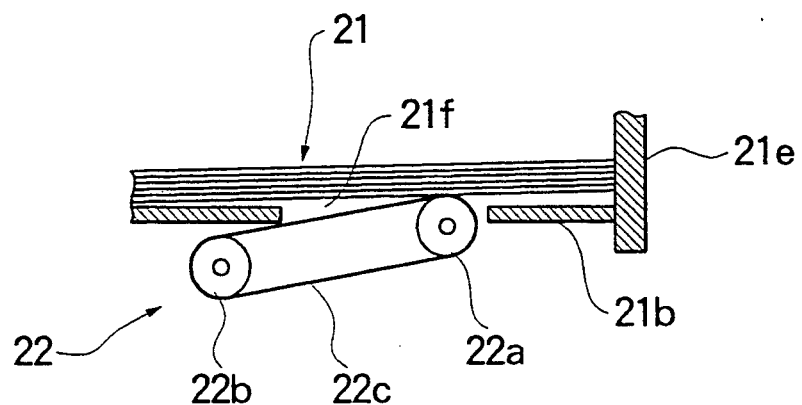
FIG. 4 is a schematic drawing showing a cross sectional view of a blank stacking section taken along a line perpendicular to the feed direction of blanks and also showing a part of a movable roller and an endless belt constituting a second aligning member which project from an opening into the internal space of the blank stacking section.

FIGS. 3 and 4 are schematic cross sectional views of the blank stacking section 21 taken along a line perpendicular to the blank feeding direction. FIG. 3 shows the second aligning member 22 positioned below the support plate 21b and FIG. 4 shows a part of the movable pulley 22a and the endless belt 22c projecting into the internal space of the blank stacking section 21 through the opening 21f.

The movable pulley 22a and the stationary pulley 22b are rotatable clockwise as viewed in FIGS. 3 and 4. When the movable pulley 22a is caused to project into the internal space of the blank stacking section 21 through the opening 21f by a movable pulley drive means (not shown) and the movable pulley 22a and the stationary pulley 22b are rotated clockwise in FIG. 4 by a motor (not shown), a blank fed into the blank stacking section 21 is fed by the endless belt 22c toward the side plate 21e in a direction substantially perpendicular to the feed direction of blanks and stopped at the position where it abuts against the side plate 21e. Based upon a detection signal from the sixth photosensor 23, the control unit (not shown) outputs a drive signal to the movable pulley drive means (not shown) for a predetermined time period after a check blank, front cover, divider paper or back cover has passed through the sixth photosensor 23, thereby holding the movable pulley 22a at a position where it projects into the internal space of the blank stacking section 21 via the opening 21f and when the control unit judges that the leading end of the blank has been fed below the blanks resting on the endless belt 22c, it outputs a drive signal to the movable pulley drive means (not shown) to thereby retract the movable pulley 22a to below the support plate 21b. Thereafter, when the control unit judges that the blank fed into the blank stacking section 21 has passed over the opening formed in the support plate 21b, it outputs a drive signal to the movable pulley drive means (not shown) causing it to project into the internal space of the blank stacking section 21 via the opening 21f and further drives a motor (not shown) for rotating the movable pulley 22a and the stationary pulley 22b so as to cause the blank resting on the endless belt 22c to abut against the side plate 21e. Thus, the control unit (not shown) holds the movable pulley 22a at its projecting position for a predetermined time period after the next blank has passed through the sixth photosensor 23.

The control unit (not shown) repeats the above described operation and when it judges that a predetermined number of blanks are stacked in the blank stacking section 21, it outputs a drive signal to a movable plate drive means (not shown), thereby lowering the movable plate 21c so as to cause the movable plate 21c to hold a predetermined number of blanks between itself and the support plate 21b. Thus, the predetermined number of the blanks held between the movable plate 21c and the support plate 21b are fed out from the blank stacking section 21, while one end thereof is fastened by a stapler (not shown). Then an adhesive tape is stuck around the one end edge of the blanks by an adhering mechanism (not shown) and the blanks are fed out into a take-out box 24.

In this embodiment, thirteen blanks are stacked in the order of: a front cover, seven check blanks, a divider paper, three check blanks and a back cover. This combination forms one check book. One set of the thus stacked blanks 30 are held between the movable plate 21c and the support plate 21b and are fed out from the blank stacking section 21, while one end thereof is fastened by a stapler (not shown). Then an adhesive tape is stuck around the one end edge of the blanks by an adhering mechanism (not shown) and the blanks are fed out into a take-out box 24 as one check book.

Figure 5:
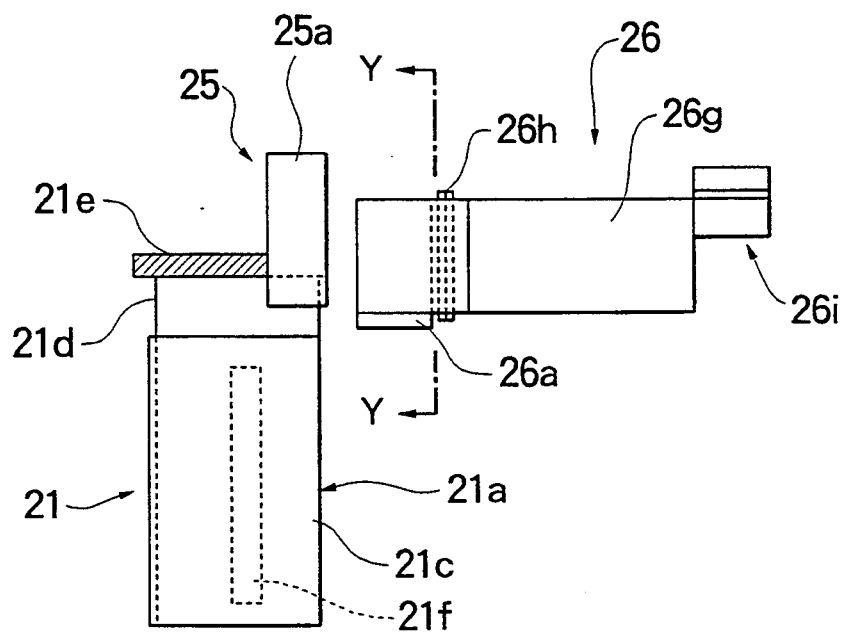
FIG. 5 is a schematic drawing showing a top plan view of a blank stacking section, a stapler and an adhering mechanism.

FIG. 5 is a schematic top plan view showing a portion including a stapler 25 and an adhering mechanism 26.

In FIG. 5, the stapler 25 comprises a movable portion 25a and a stationary portion (not shown) and is disposed at the opening 21a side of the side plate 21e so as to project from the side plate 21e toward the support plate 21b and the movable plate 21c. The stapler 25 is disposed so that the movable portion 25a of the stapler 25 is located above one end of the blanks stacked in the blank stacking section 21 and the stationary portion thereof is located below the same end of the blanks stacked in the blank stacking section 21. After one set of the blanks 30 has been held between the movable plate 21c and the support plate 21b, the control unit outputs a drive signal to a stapler drive means (not shown) to drive the movable portion 25a and press the end portion of the set of blanks 30 held between the movable plate 21c and the support plate 21b and staple them together.

An adhering mechanism 26 is disposed on the opposite side of the stapler 25 from the end plate 21d, and when the one end portion of a set of the blanks 30 has been fastened by the stapler 25, the control unit (not shown) outputs a drive signal to a stacking section drive means (not shown), thereby gradually moving the support plate 21b and the movable plate 21c in substantially the horizontal direction away from the end plate 21d and feeding the set of blanks 30 to the adhering mechanism 26.

Figure 6:
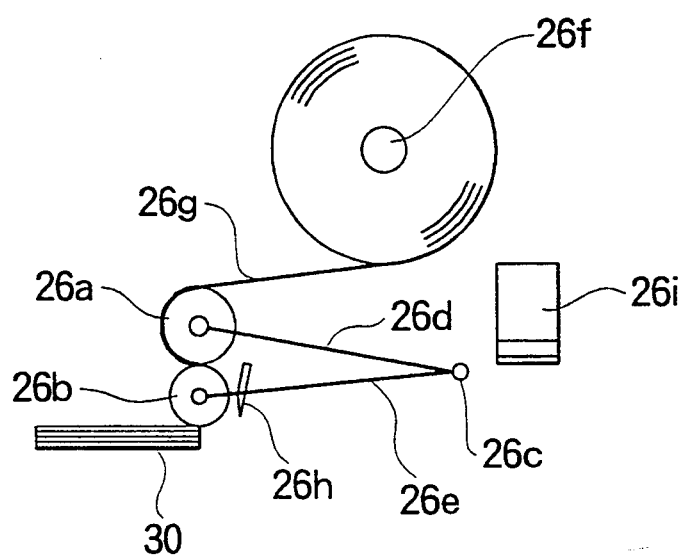
FIG. 6 is a schematic drawing showing a side view of an adhering mechanism.
Figure 7:
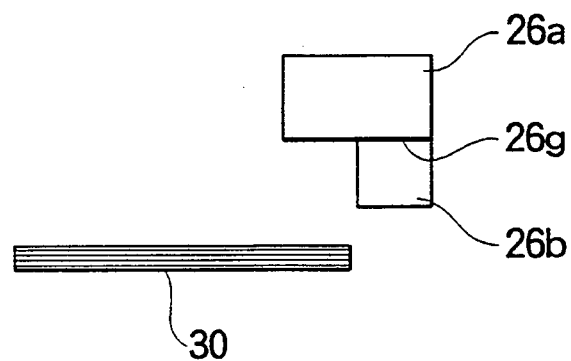
FIG. 7 is a schematic drawing showing a cross sectional view taken along a line Y—Y of FIG. 5.

FIG. 6 is a schematic side view of the adhering mechanism 26 and FIG. 7 is a schematic cross sectional view taken along a line Y—Y of FIG. 5.

Figure 8:
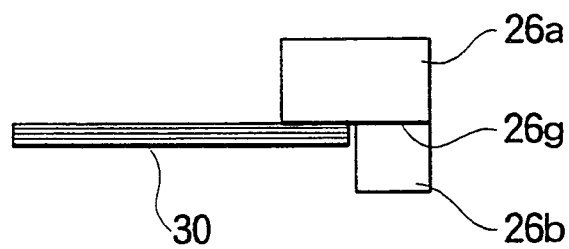
FIG. 8 is a schematic cross sectional view showing a pair of lowered movable rollers and an adhesive tape contacting an edge surface of a front cover.
Figure 9:
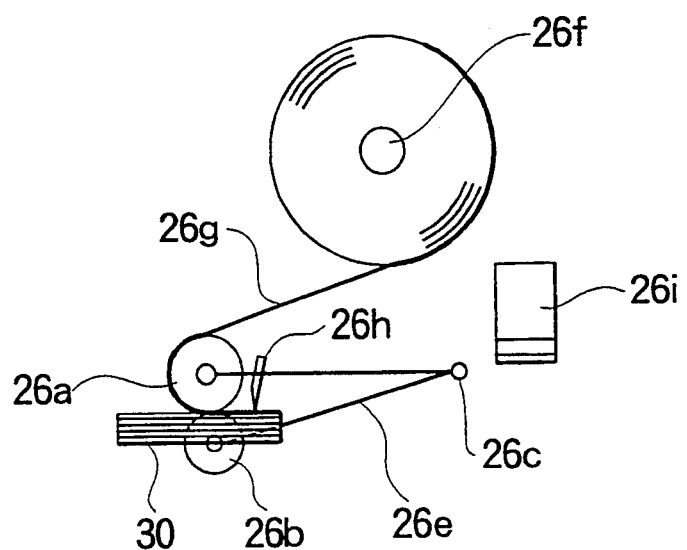
FIG. 9 is a schematic side view showing the blank stacking section further moved substantially horizontally after a pair of movable rollers were lowered from the position shown in FIG. 6.

The adhering mechanism 26 comprises a pair of movable rollers 26a, 26b which are disposed so as to align with each other in the vertical direction. The movable roller 26a is rotatably mounted on an arm 26d swingably supported by a support portion 26c and the movable roller 26b is rotatably mounted on an arm 26e swingably supported by the support portion 26c. This pair of movable rollers 26a and 26b hold the leading end of an adhesive tape 26g paid off from an adhesive tape roll 26f and the arms 26d and 26e are arranged to be lowered by swinging them about the support portion 26c using an arm drive means (not shown), as shown in FIGS. 8 and 9, in synchronism with the substantially horizontal movement of the support plate 21b and the movable plate 21c. The axial length of the lower movable roller 26b is shorter than that of the upper movable roller 26a, whereby the movable roller 26b can be lowered to a position below the edge of the set of blanks 30 held between the support plate 21b and the movable plate 21c but the movable roller 26a can be lowered only until it contacts the surface of the uppermost blank of the set of blanks 30 held between the support plate 21b and the movable plate 21c in the vicinity of the edge thereof.

Figure 10:
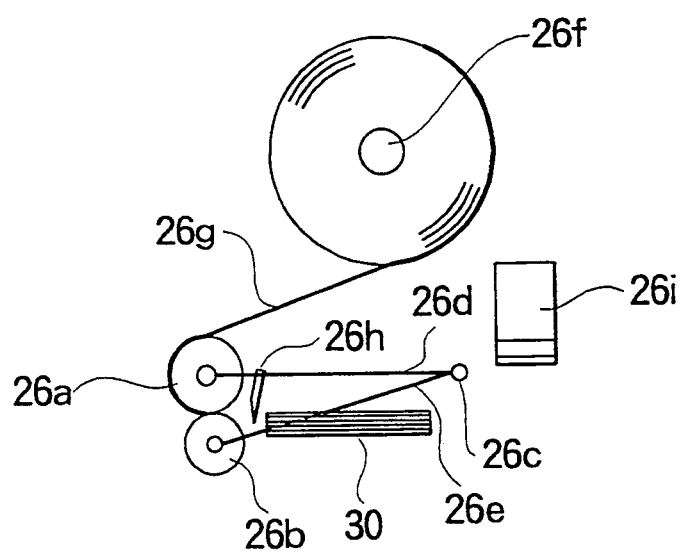
FIG. 10 is a schematic side view showing the blank stacking section further moved substantially horizontally from the position shown in FIG. 9 and an adhesive tape stuck on the entire surface of an edge portion of the front cover and cut by a cutter.

The leading end of the adhesive tape 26g paid off from the adhesive tape roll 26f is held between the pair of movable rollers 26a, 26b with the adhesive surface directed downwardly and when the pair of the movable rollers 26a, 26b are lowered, the adhesive surface of the adhesive tape 26g comes into contact with the surface of the uppermost blank of the set of blanks 30 held between the support plate 21b and the movable plate 21c. The pair of movable rollers 26a, 26b are rotated in accordance with the movement of the support plate 21b and the movable plate 21c in substantially the horizontal direction, whereby the adhesive tape 26g is drawn from the adhesive tape roll 26f and is stuck on the surface of the edge of the uppermost blank held between the support plate 21b and the movable plate 21c. When the control unit (not shown) detects, based upon the amount of the movement of the support plate 21b and the movable plate 21c in substantially the horizontal direction, that the adhesive tape 26g has been stuck on the entire width of the edge of the uppermost blank, it outputs a drive signal to a cutter drive means (not shown), thereby lowering a cutter 26h and cutting the adhesive tape 26g. FIG. 10 shows the adhesive tape 26g cut by the cutter 26h.

Figure 11:
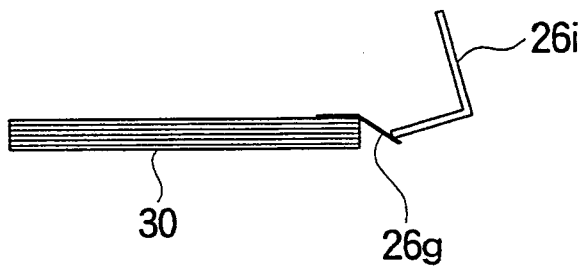
FIG. 11 is a schematic side view showing the adhering mechanism of FIG. 5, lowered and in contact with the non-adhesive surface of an adhesive tape.
Figure 12:
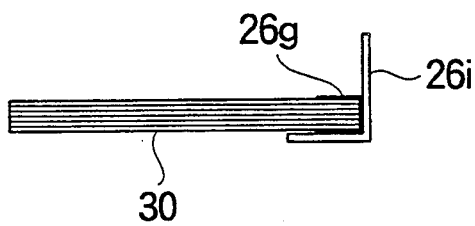
FIG. 12 is a schematic side view showing the adhering mechanism further lowered and rotated from the position shown in FIG. 11 and an adhesive tape stuck on the front cover, a first predetermined number of check blanks, a divider paper, a second predetermined number of check blanks and a back cover so as to cover them.
Figure 13:
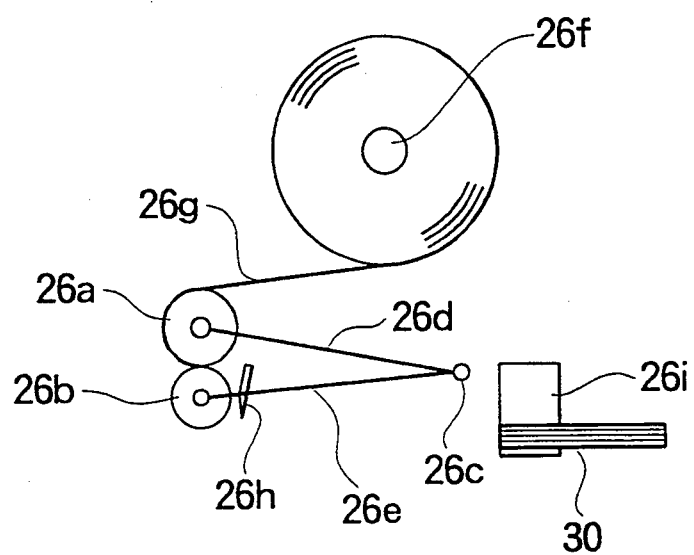
FIG. 13 is a schematic side view showing the blank stacking section further moved substantially horizontally from the position shown in FIG. 10, the adhesive tape stuck on the front cover, the first predetermined number of check blanks, the divider paper, the second predetermined number of check blanks and the back cover so as to cover them, and a check book so produced.

After the adhesive tape 26g has been cut by the cutter 26h, the support plate 21b and the movable plate 21c are moved substantially horizontally and the control unit (not shown) outputs a drive signal to an adhering member drive means (not shown) in synchronism with this movement of the support plate 21b and the movable plate 21c, thereby lowering a reverse L-shaped adhering member 26i. In this state, the portion of the adhesive tape 26g which is not stuck on the surface of the blank extends outwardly from the edge of the uppermost blank and as shown in FIG. 11. The reverse L-shaped adhering member 26i comes into abutment against the portion of the adhesive tape 26g which is not stuck on the surface of the blank as the adhering member 26i is lowered, thereby pressing and lowering the portion of the adhesive tape 26g. In this state, the control unit (not shown) outputs a drive signal to the adhering member drive means, thereby lowering and rotating the adhering member 26i. As a result, as shown in FIG. 12, the adhesive tape 26g is stuck so as to cover the edge of the set of blanks 30 held between the support plate 21b and the movable plate 21c. When the support plate 21b and the movable plate 21c are further moved substantially horizontally and reach the other end of the set of blanks 30 held between the support plate 21b and the movable plate 21c, the adhesive tape 26g covers the entire edge of the set of blanks 30 held between the support plate 21b and the movable plate 21c and is stuck thereon, thus completing a check book. FIG. 13 shows the check book made by covering the entire edge of the set of blanks 30 held between the support plate 21b and the movable plate 21c with the adhesive tape 26g and sticking the adhesive tape 26g thereon.

After the check book has been completed in this manner, the support plate 21b and the movable plate 21c are further moved in substantially the horizontal direction with the check book held therebetween and the check book is deposited in the take-out box 24. The body of the check book issuing machine on the side of the take-out box 24 is formed with a shutter 27 and when the control unit (not shown) judges based upon the drive time of the stacking section drive means (not shown) that the check book has been fed into the take-out box 24, it outputs a drive signal to a shutter drive means (not shown) for driving the shutter 27, thereby opening the shutter 27 and enabling the check book to be taken out by a customer.

An unreceived check book box 29 is provided below the take-out box 24 for accommodating check books which are not taken out by the customers. When a check book has not been taken by the customer by the time that a predetermined time period has passed after it was fed into the take-out box 24 and the shutter 27 was opened by the shutter drive means 66, the control unit outputs a reverse drive signal to the stacking section drive means so as to retract the support plate 21b and the movable plate 21c and outputs a drive signal to a stopper drive means (not shown) so as to move a stopper 28, thereby positioning the stopper 28 in the path where the support plate 21b and the movable plate 21c are to be moved. The stopper 28 is adapted for being moved by the stopper drive means and is retracted from the path where the support plate 21b and the movable plate 21c are to be moved when the support plate 21b and the movable plate 21c feed the check book into the take-out box 24. On the other hand, when the check book once fed into the take-out box 24 is collected by moving the support plate 21b and the movable plate 21c in the reverse direction, the stopper 28 is positioned between the support plate 21b and the movable plate 21c within the path where the support plate 21b and the movable plate 21c are to be moved. As a result, the stopper 28 prevents the check book from being retracted so that the check book separates from the support plate 21b and the movable plate 21c and is stored in the unreceived check book box 29.

Figure 14:
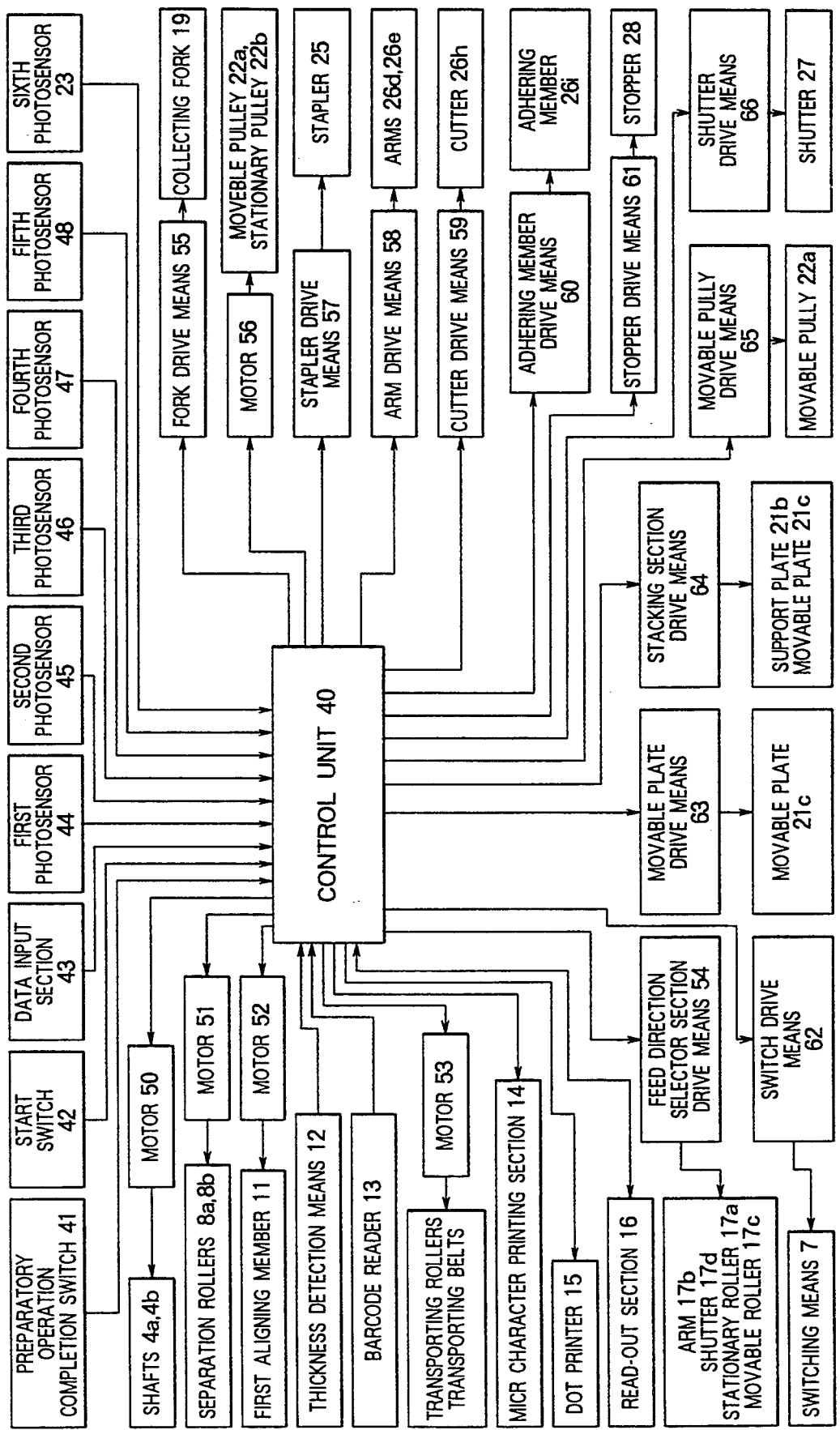
FIG. 14 is a block diagram of an input system, a detection system, a control system and a drive system of a check book issuing machine which is an embodiment of the present invention.

FIG. 14 is a block diagram of an input system, a detection system, a control system and a drive system of a check issuing machine which is an embodiment of the present invention.

In FIG. 14, the control unit 40 constituting the control system of the check issuing machine which is an embodiment of the present invention receives a preparatory operation completion signal output from a preparatory operation completion switch 41 operated by the operator after he or she has loaded check blanks, front covers, back covers and divider papers into the check book issuing machine, a start signal output from a start switch 42 operated by a customer when requesting a check book, an input signal output from a data input section 43 to which the customer's data are to be input, detection signals output from a first photosensor 44, a second photosensor 45, a third photosensor 46, a fourth photosensor 47, a fifth photosensor 48, a sixth photosensor 23 and a thickness detecting means 12, and read-out signals output from a barcode reader 13 and a read-out section 16.

Based upon these input signals, the control unit 40 selectively outputs drive signals to a motor 50 for rotating the shafts 4a, 4b, namely, the pulleys 5a, 5b, 5c, a motor 51 for rotating the separation rollers 8a, 8b, a motor 52 for vibrating the first aligning member 11, a motor 53 for rotating the transporting rollers 10a, 10b, 10c, 10d, 10e, 10f and the other transporting rollers (not shown) and driving the transporting belts (not shown), the MICR character printing section 14, the dot printer 15, the read-out section 16, a feed direction selector section drive means 54 for swinging the arm 17b of the feed direction selector section 17, opening the shutter 17d and rotating the stationary roller 17a and the movable roller 17c, a fork drive means 55 for driving the collecting fork 19, a motor 56 for rotating the movable pulley 22a and the stationary pulley 22b of the second aligning means 22, a stapler drive means 57 for driving the stapler 25, an arm swinging means 58 for swinging the arms 26d, 26e of the adhering mechanism 26, a cutter drive means 59 for operating the cutter 26h, an adhering member drive means 60 for moving and rotating the adhering member 26i and a stopper drive means 61 for driving the stopper 28. Further, the control unit 40 outputs a first switch signal or a second switch signal to a switch drive means 62 for driving the switching means 7, and outputs drive signals or reverse drive signals to a movable plate drive means 63 for vertically moving the movable plate 21c of the blank stacking section 21, a stacking section drive means 64 for moving the support plate 21b and the movable plate 21c of the blank stacking section 21 in substantially the horizontal direction, a movable pulley moving means 65 for vertically moving the movable pulley 22a of the second aligning member 22 and a shutter drive means 66 for opening and closing the shutter 27 of the take-out box 24.

The thus constituted check book issuing machine which is an embodiment of the present invention issues check books in the following manner.

At first, the operator loads a number of check blanks in the upright condition in the first storing section 1 and a predetermined number of sets of front covers, divider papers and back covers in the upright condition in the second storing section 2 in such a manner that each set consists of three blanks, namely, a front cover, a divider paper and a back cover arranged in such order that the front cover is closest to the endless belts 6a, 6b and the back cover is farthest therefrom. Thereafter, when the preparatory operation completion switch 41 is operated by the operator, a preparatory operation completion signal is input to the control unit 40 and the control unit 40 outputs a drive signal to the motor 52, thereby vibrating the first aligning member 11. As a result, the check blanks are aligned so that the front ends thereof abut against the front plate 1a and the front covers, divider papers and back covers are aligned so that the front ends thereof abut against the front plate 2a, whereby the check book issuing preparatory operation is completed.

After the check book issuing preparatory operation has been completed, the start switch 41 is turned on by the operator and when the start signal is input to the control unit 40, the control unit 40 outputs drive signals to the motors 50, 53, thereby rotating the shafts 4a, 4b, the transporting rollers 10a, 10b, 10c, 10d, 10e, 10f and the other transporting rollers (not shown) and driving transporting belts (not shown). As a result, the pulleys 5a, 5b, 5c are rotated and the endless belts 6a, 6b are driven.

Then, the control unit 40 outputs a first switch signal to the switch drive means 62 so as to slide the switching means 7 toward the check blanks stored in the first storing section 1. As a consequence, the check blanks are separated from the endless belts 6a, 6b while, on the other hand, since a front cover is pressed onto the endless belts 6a, 6b by the press member 7b, the front cover is taken out from the second storing section 2 by the endless belts 6a, 6b and fed out to the transporting passage 9 with double feed being prevented by the separation rollers 8a, 8b.

The front cover fed out to the transporting passage 9 is pressed onto the surface of the transporting passage 9 by the transporting rollers 10a, 10b rotating at higher speed than that of the pulleys 5a, 5b, 5c and the transporting belt (not shown) and fed along the transporting passage 9. The thickness thereof is detected by the thickness detecting means 12 and a detection signal is output to the control unit. 40. The control unit 40 judges based upon the detection signal from the thickness detecting means 12 whether or not the front cover is being fed alone and stores the result of the judgment in a memory (not shown).

In this manner, the front cover whose thickness has been detected by the thickness detecting means 12 is fed to the barcode reader 13 and the barcode printed on a part thereof is read out by the barcode reader 13 so that a read-out signal is input to the control unit 40. Based upon the thus input read-out signal, the control unit 40 judges the kind of the blank and whether or not the desired kind of blank, a front cover in this case, is being fed.

Although a front cover should be being fed, if the control unit 40 judges that another kind of blank is being fed, it outputs a drive signal to the fork drive means 55 at the time the blank is detected by the fifth photosensor 48, thereby driving the collecting fork 19 and leading the blank into the collecting box 20 so as to be collected therein. If based upon the detection signal from the thickness detecting means 12, the control unit 40 judges that double feed has occurred and the front cover is being fed together with a divider paper, it outputs a drive signal to the fork drive means 55 at the time the front cover and the divider paper are detected by the fifth photosensor 48, thereby driving the collecting fork 19 and leading the front cover and the divider paper into the collecting box 20 so as to be collected therein.

On the contrary, even though a front cover is being fed, if based upon the detection signal from the thickness detecting means 12, the control unit judges that double feed has occurred and the front cover is being fed together with a divider paper, it outputs a drive signal to the fork drive means 55 at the time the front cover and the divider paper are detected by the fifth photosensor 48, thereby driving the collecting fork 19 and leading the two blanks into the collecting box 20 so as to be collected therein.

Thus, if the control unit 40 judges that a front cover is not being fed or that one is but that double feed occurred, it again outputs a first switch signal to the switch drive means 62, thereby sliding the switching means 7 toward the check blanks stored in the first storing section 1 and takes out blanks from the second storing section 2 until it judges based upon the detection signal from the thickness detecting means 12 and the read-out signal from the barcode reader 13 that no double feed has occurred and that a front cover is being fed.

On the other hand, if based upon the detection signal from the thickness detecting means 12 and the read-out signal from the barcode reader 13, the control unit 40 judges that no double feed has occurred and that a front cover is being fed, it stores the kind of blank, a front cover in this case, in the memory (not shown) and outputs a second switch signal to the switch drive means 62, thereby sliding the switching means 7 toward a divider paper stored in the second storing section 2. As a result, the divider paper facing the endless belts 6a, 6b is separated from the endless belts 6a, 6b and, on the other hand, since the check blanks stored in the first storing section 1 are pressed onto the endless belts 6a, 6b by the press member 7a, a check blank is taken out from the first storing section 1 and fed out to the transporting passage 9 with double feed being prevented by the separation rollers 8a, 8b.

The front cover which has passed through the barcode reader 13 is further fed in the transporting passage 9 and detected by the first photosensor 44, whereby a detection signal is input to the control unit 40. The control unit 40 reads the kind of blank stored in the memory based upon the read-out signal from the barcode reader 13 and if it judges that the blank detected by the first photosensor 44 is not a check blank, it outputs no drive signal to the MICR character printing section 14. Therefore, in this case, no drive signal is output to the MICR character printing section 14 and the front cover passes through the MICR character printing section 14 to be fed to the dot printer 15.

When the second photosensor 45 provided immediately upstream of the dot printer 15 detects the front cover, a detection signal is input to the control unit 40. The control unit 40 reads the kind of blank stored in the memory (not shown) and outputs a drive signal determined in accordance with the kind of blank to the dot printer 15. As a result, a predetermined portion of the surface of the front cover is printed in a desired manner by the dot printer 15.

The front cover on which a predetermined data were printed by the dot printer 15 is further fed downstream in the transporting passage 9 and when it is detected by the third photosensor 46, a detection signal is output to the control unit 40. When the control unit 40 receives a detection signal input from the third photosensor 46, it reads out the kind of blank stored in the memory (not shown) and if the blank detected by the third photosensor 46 is not a check blank, the control unit 40 outputs no drive signal to the read-out section 16. In this case, the front cover passes through the read-out section 16 and is fed to the feed direction selector section 17.

When the fourth photosensor 47 provided immediately upstream of the feed direction selector section 17 in the transporting passage 9 detects the front cover, a detection signal is input to the control unit 40. When the control unit 40 receives the detection signal from the fourth photosensor 47, it outputs a drive signal to the feed direction selector section 17, thereby swinging the arm 17b so that the front cover is held between the movable roller 17c and the stationary roller 17a. Further, the control unit 40 opens the shutter 17d and rotates the movable roller 17c and the stationary roller 17a, thereby feeding the front cover to the transporting passage 9 below the shutter 17d.

The front cover is further fed in the transporting passage 9 by a transporting belt (not shown) and when it is detected by the fifth photosensor 48, a detection signal is input to the control unit 40. If based upon the result of the judgment stored in the memory (not shown), the control unit 40 judges that the blank detected by the fifth photosensor 48 is to be collected in the collecting box 20, it outputs a drive signal to the fork drive means 55 and drives the collecting fork 19, thereby leading the blank into the collecting box 20 to be collected therein.

On the contrary, if the blank detected by the fifth photosensor 48 is not to be collected in the collecting box 20, the control unit 40 outputs no drive signal to the fork drive means 55 and, therefore, the front cover is fed along the reverse C-shaped guide member 18 toward the blank stacking section 21.

When the front cover is detected by the sixth photosensor 23 provided immediately upstream of the opening 21a of the blank stacking section 21, a detection signal is input to the control unit 40. When a predetermined time period has passed after the detection signal was input from the sixth photosensor 23, the control unit 40 outputs a reverse drive signal to the movable pulley moving means 56, thereby lowering the movable pulley 22a of the second aligning member 22 from the opening 21a to a position below the support plate 21b so as to retract it from the space between the support plate 21b and the movable plate 21c. As a result, the front cover stops at the position where it abuts against the end plate 21d. Thereafter, the control unit 40 outputs a drive signal to the movable pulley moving means 56 so as to elevate the movable pulley 22a of the second aligning member 22 until it projects from the opening 21f into the space between the support plate 21b and the movable plate 21c, thereby causing the endless belt 22c wound around the movable pulley 22a and the stationary pulley 22b to come into abutment with the lower surface of the front cover fed into the blank stacking section 21. Further, the control unit 40 outputs a drive signal to the motor 56, thereby rotating the movable roller 22a and the stationary roller 22b of the second aligning member 22. As a result, the front cover is caused to abut against the side plate 21e by the endless belt 22c.

The check blank taken out from the first storing section 1 into the transporting passage 9 by the endless belts 6a, 6b and the separation rollers 8a, 8b, because the control unit 40 judged, based upon the detection signal from the thickness detecting means 12 and the read-out signal from the barcode reader 13, that no double feed occurred and that the front cover was being fed and, therefore, output the second switch signal to the switch drive means 62 so that the switching means 7 was slid toward a divider paper stored in the second storing section 2, is pressed onto the surface of the transporting passage 9 by the transporting rollers 10a, 10b and the transporting belt (not shown) and is fed in the transporting passage 9. Then the thickness of the check blank is detected by the thickness detecting means 12 and a detection signal is output to the control unit 40. The control unit 40 judges based upon the detection signal from the thickness detecting means 12 whether or not double feed of check blanks has occurred and stores the result of the judgment in the memory (not shown).

The check blank whose thickness was detected in this manner is fed to the barcode reader 13 and the barcode printed on a part of the surface thereof are read out so that a read-out signal is input to the control unit 40. The control unit 40 judges based upon the thus input read-out signal whether or not a check blank is being fed.

As a result, when the control unit 40 judges that a blank other than a check blank is being fed, it outputs a drive signal to the fork drive means 55 at the time when the blank is detected by the fifth photosensor 48 and drives the collecting fork 19, thereby leading the blank into the collecting box 20 to be collected therein. Further, when the control unit 40 judges based upon the detection signal from the thickness detecting means 12 that double feed has occurred, the control unit 40 outputs a drive signal to the fork drive means 55 at the time when the these blanks are detected by the fifth photosensor 48 and drives the collecting fork 19, thereby leading these blanks into the collecting box 20 to be collected therein.

On the contrary, even though the check blank is being fed, if based upon the detection signal from the thickness detecting means 12, the control unit 40 judges that double feed has occurred, it outputs a drive signal to the fork drive means 55 at the time when the these blanks are detected by the fifth photosensor 48 and drives the collecting fork 19, thereby leading these blanks into the collecting box 20 to be collected therein.

On the other hand, if based upon the detection signal from the thickness detecting means 12 and the read-out signal from the barcode reader 13, the control unit 40 judges that no double feed has occurred and that a check blank is being fed, it stores the kind of blank, a check blank in this case, in the memory (not shown).

The check blank which has passed through the barcode reader 13 is further fed in the transporting passage 9 and when it is detected by the first photosensor 44, a detection signal is input to the control unit 40. The control unit 40 reads the kind of blank stored in the memory (not shown) based upon a read-out signal from the barcode reader 13 and if it judges that the blank detected by the first photosensor 44 is a check blank, it outputs a drive signal to the MICR character printing section 14. As a result, printing data consisting of the MICR characters are printed on a predetermined portion of the surface of the check blank by the MICR character printing section 14 and the check blank is further fed to the dot printer 15.

When the second photosensor 45 provided immediately upstream of the dot printer 15 detects the check blank, a detection signal is input to the control unit 40. The control unit 40 reads the kind of blank stored in the memory (not shown) and outputs a drive signal including instructions determined in accordance with the kind of blank to the dot printer 15. As a result, desired printing is made on a predetermined portion of the surface of the check blank by the dot printer 15.

The check blank on which predetermined data were printed by the dot printer 15 is further fed downstream in the transporting passage 9 and when it is detected by the third photosensor 46, a detection signal is output to the control unit 40. When the control unit 40 receives the detection signal from the third photosensor 46, it reads out the kind of blank stored in the memory (not shown) and outputs a drive signal to the read-out section 16 if the blank detected by the third photosensor 46 is a check blank. As a result, the read-out section 16 reads the MICR characters printed on the surface of the check blank and outputs a read-out signal to the control unit 40. The control unit 40 judges based upon the read-out signal input from the read-out section 16 whether or not the printing data consisting of the predetermined MICR characters are printed on a predetermined portion of the check blank. When the result of this judgment is NO, the control unit 40 judges that the check blank is to be collected in the collecting box 20 and stores the result of the judgment in the memory (not shown).

On the contrary, when the result of this judgment is YES, namely, when the control unit 40 judges that the printing data consisting of the predetermined MICR characters are printed on a predetermined portion of the check blank and that a check has been produced, it further judges the kind of blank to be taken out next and outputs a first switch signal or a second switch signal to the switch drive means 62. In this embodiment, one check book is produced by binding a front cover, seven checks, a divider paper, three checks and a back cover in this order. Therefore, after a front cover has been taken out from the second storing section 1, when the number 6f checks which have been produced from check blanks taken out from the first storing section 1 and printed with the printing data consisting of the predetermined MICR characters on a predetermined portion of thereof, there having been no double feeding, is less than seven and, after a divider paper has been taken out from the second storing section 1, when the number of checks which have been produced from check blanks taken out from the first storing section 1 and printed with the printing data consisting of the predetermined MICR characters on a predetermined portion of thereof, there having been no double feeding, is less than three, the control unit 40 outputs a second switch signal to the switch drive means thereby taking out a check blank from the first storing section 1. In other cases, the control unit 40 outputs a first switch signal to the switch drive means 62, thereby taking out a divider paper or a back cover from the second storing section 2. In this manner, the control unit 40 selectively outputs a first switch signal or a second switch signal to the switch drive means 62.

The check which has passed through the read-out section 16 is further fed to the feed direction selector section 17.

When the fourth photosensor 47 provided immediately upstream of the feed direction selector section 17 detects the check, a detection signal is input to the control unit 40. When the control unit 40 receives the detection signal from the fourth photosensor 47, it outputs a drive signal to the feed direction selector section drive means 54, thereby swinging the arm 17b and holding the check between the movable roller 17c and the stationary roller 17a. Further, the control unit 40 opens the shutter 17d and rotates the movable roller 17c and the stationary roller 17a, thereby feeding out the check into the transporting passage 9 below the shutter 17d.

The check is further fed by a transporting belt (not shown) in the transporting passage 9 and when it is detected by the fifth photosensor 48, a detection signal is input to the control unit 40. If, based upon the result of the judgment stored in the memory (not shown), the control unit 40 judges that the blank detected by the fifth photosensor 48 is to be collected in the collecting box 20, it outputs a drive signal to the fork drive means 55 and drives the collecting fork 19, thereby leading the blank into the collecting box 20 to be collected therein.

On the contrary, if the blank detected by the fifth photosensor 48 is not to be collected in the collecting box 20, the control unit 40 outputs no drive signal to the fork drive means 55 and, therefore, the check is fed along the reverse C-shaped guide member 18 toward the blank stacking section 21.

When the check is detected by the sixth photosensor 23 provided immediately upstream of the opening 21a of the blank stacking section 21, a detection signal is input to the control unit 40. In this state, since the movable pulley 22a of the second aligning member 22 projects from the opening 21f into the space between the support plate 21b and the stationary plate 21c, the check fed into the blank stacking section 21 through the opening 21a is fed below the front cover which is stored in the blank stacking section 21 and abuts against the side plate 21e. When a predetermined time period has passed after the control unit 40 received the detection signal from the sixth photosensor 23, namely, after the check was fed below the front cover and before it comes into abutment against the endless belt 22c wound around the movable pulley 22a and the stationary pulley 22b, the control unit 40 outputs a reverse drive signal to the movable pulley moving means 65 and lowers the movable pulley 22a of the second aligning member 22 from the opening 21f to a position below the support plate 21b, thereby retracting it from the space between the support plate 21b and the stationary plate 21c. As a result, the check stops at the position where it abuts against the end plate 21d. Thereafter, the control unit 40 outputs a drive signal to the movable pulley moving means 65 so as to elevate the movable pulley 22a of the second aligning member 22 until it projects from the opening 21f into the space between the support plate 21b and the movable plate 21c and causes the endless belt 22c wound around the movable pulley 22a and the stationary pulley 22b to abut against the lower surface of the check fed into the blank stacking section 21. Further, the control unit 40 outputs a drive signal to the motor 56 so as to rotate the movable pulley 22a and the stationary pulley 22b. As a result, the check is caused to abut against the side plate 21e below the front cover.

Thus, after the front cover has been placed in the blank stacking section 21, in a similar manner to the above, seven check blanks are fed out from the first storing section 1 into the transporting passage 9 and the printing data consisting of the desired MICR characters are printed thereon so that checks are produced and stacked in the blank stacking section 21.

When the control unit 40 judges based upon the read-out signals from the read-out section 16 that seven check blanks following the front cover have been fed out from the first storing section 1 into the transporting passage 9 and the printing data consisting of the desired MICR characters have been printed thereon, it outputs a first switch signal to the switch drive means 62 and slides the switching means 7 toward the check blanks stored in the first storing section 1. As a result, since the check blanks are separated from the endless belts 6a, 6b while, on the other hand, since a divider paper-stored in the second storing section 2 and facing the endless belts 6a, 6b is pressed onto the endless belts 6a, 6b by the press member 7b, the divider paper is taken out from the second storing section 2 by the endless belts 6a, 6b and fed out into the transporting passage 9. The action of the separation rollers 8a, 8b ensures that only a single divider paper is fed.

In a similar manner to the front cover, if based upon a detection signal from the thickness detecting means 12, the control unit 40 judges that no double feed has occurred and, based upon a read-out signal from the barcode reader 13, judges that the blank fed into the transporting passage 9 from the second storing section 2 is a divider paper, it outputs a second switch signal to the switch drive means 62 and slides the switching means 7 toward a back cover stored in the second storing section 2 and facing the endless belts 6a, 6b so that a check blank is taken out from the first storing section 1 by the endless belts 6a, 6b and the separation rollers 8a, 8b and fed into the transporting passage 9, while double feed is being prevented. In other cases, the control unit 40 outputs a first switch signal to the switch drive means 62 so as to take out a front cover, a divider paper or a back cover from the second storing section 2 and feed it into the transporting passage 9. Only after the control unit 40 judged based upon a detection signal from the thickness detecting means 12 that no double feed has occurred and based upon a read-out signal from the barcode reader 13 that a divider paper is being fed, it outputs a second switch signal to the switch drive means 62 to slide the switching means 7 toward a back cover stored in the second storing section 2 and facing the endless belts 6a, 6b, thereby causing the endless belts 6a, 6b and the separation rollers 8a, 8b to take out a check blank from the first storing section 1 and feed it into the transporting passage 9, while double feed is being prevented. In cases other than when the control unit 40 judges based upon a detection signal from the thickness detecting means 12 that no double feed has occurred and based upon a read-out signal from the barcode reader 13 that a divider paper is being fed, all blanks taken out from the second storing section 2 are collected in the collecting box 20 until the control unit 40 judges based upon a detection signal from the thickness detecting means 12 that no double feed has occurred and based upon a read-out signal from the barcode reader 13 that a divider paper is being fed.

If based upon a detection signal from the thickness detecting means 12, the control unit 40 judges that no double feed occurs and based upon a read-out signal from the barcode reader 13, judges that a divider paper is being fed, in a similar manner to the front cover, the divider paper is fed into the blank stacking section 21 via the MICR character printing section 14, the dot printer 15, the read-out section 16, the feed direction selector section 17 and the guide member 18. When the divider paper is detected by the sixth photosensor 23, a detection signal is input to the control unit 40. In this state, since the movable pulley 22a of the second aligning member 22 projects from the opening 21f into the space between the support plate 21b and the movable plate 21c, the divider paper fed into the blank stacking section 21 is fed to below the lowermost check of the seven checks stacked in the blank stacking section 21 and abutted against the side plate 21e. When a predetermined time period has passed after the control unit 40 received a detection signal from the sixth photosensor 23, namely, after the divider paper was fed below the lowermost check and before it comes into abutment with the endless belt 22c, the control unit 40 outputs a reverse drive signal to the movable pulley moving means 65 and lowers the movable pulley 22a of the second aligning member 22 from the opening 21f to a position below the support plate 21b so as to be retracted from the space between the support plate 21b and the movable plate 21c. As a result, the divider paper stops at the position where it abuts against the end plate 21d. Thereafter, the control unit 40 outputs a drive signal to the movable pulley moving means 65 and elevates the movable pulley 22a of the second aligning member 22 until it projects from the opening 21f into the space between the support plate 21b and the movable plate 21c, thereby causing the endless belt 22c to abut against the lower surface of the divider paper fed into the blank stacking section 21. Further, the control unit 40 outputs a drive signal to the motor 56 and rotates the movable pulley 22a and the stationary pulley 22b. As a result, the divider paper is caused to abut against the side plate 21e below the seven checks.

As described above, after the control unit 40 judges based upon a detection signal from the thickness detecting means 12 that no double feed has occurred and judges based upon a read-out signal from the barcode reader 13 that a divider paper is being fed, in a similar manner to that in which seven or more check blanks were taken out from the first storing section 1 following the front cover, printed with the printing data consisting of the MICR characters and the seven checks were stacked in the blank stacking section 21, three or more check blanks are taken out from the first storing section 1 into the transporting passage 9 and the printing data consisting of MICR characters are printed on the surfaces thereof and when the control unit 40 judges that three checks have been produced, it outputs a first switch signal to the switch drive means 62 so as to take out a back cover from the second storing section 1 and feed it into the transporting passage 9.

In a similar manner to the front cover and the divider paper, the back cover taken out from the second storing section 2 and fed into the transporting passage 9 is printed by the dot printer 15 and stored in the blank stacking section 21, if based upon a detection signal from the thickness detecting means 12, the control unit 40 judges that one back cover was being fed and, based upon a read-out signal from the barcode reader 13, judges that a back cover was being fed. In other cases, the control unit 40 outputs a first switch signal to the switch drive means 62 and takes out blanks until the control unit 40 judges based upon a detection signal from the thickness detecting means 12 that a single blank is being fed and judges based upon a read-out signal from the barcode reader 13 that a back cover is being fed.

When the front cover, the seven checks, the divider paper, the three checks and the back cover have been stacked in this order from the top in the blank stacking section 21 as described above, the control unit 40 outputs a drive signal to the movable plate moving means 63 so as to move the movable plate 21c of the blank stacking section 21 downward, thereby causing it to hold between itself and the support plate 21b a set of blanks 30 consisting of the front cover, the checks, the divider paper and the back cover.

Thereafter, the control unit 40 outputs a drive signal to the stapler drive means 57 so as to lower the movable portion 25a of the stapler 25, whereby the set of blanks 30 held between the movable plate 21c and the stationary plate 21b are pressed by the movable portion 25a and the stationary portion and fastened by the stapler 25.

Further, the control unit 40 outputs a drive signal to the stacking section drive means 64, thereby moving the support plate 21b and the movable plate 21c holding the set of blanks 30 therebetween toward the adhering mechanism 26 in substantially the horizontal direction.

At the same time it outputs a drive signal to the stacking section drive means 64, the control unit 40 outputs a drive signal to the arm drive means 58 so as to swing the arms 26d, 26e of the adhering mechanism 26 in synchronism with the substantially horizontal movement of the support plate 21b and the movable plate 21c, thereby lowering the pair of movable rollers 26a, 26b. The leading end portion of the adhesive tape 26g paid off from the adhesive tape roll 26f is held between the pair of movable roller 26a, 26b and as shown in FIG. 8, when the pair of movable roller 26a, 26b are lowered, the adhesive surface of the adhesive tape 26g comes into contact with the surface of the edge portion of the front cover held between the support plate 21b and the movable plate 21c. As shown in FIG. 9, in accordance with the movement of the support plate 21b and the movable plate 21c in substantially the horizontal direction, the pair of movable rollers 26a, 26b are rotated, whereby the adhesive tape 26g is drawn from the adhesive tape roll 26f and stuck on the surface of the edge portion of the front cover held between the support plate 21b and the movable plate 21c. When based upon the amount of the movement of the support plate 21b and the movable plate 21c, the control unit 40 detects that the adhesive tape 26g has been stuck on the entire surface of the edge portion of the front cover, it outputs a drive signal to the cutter drive means 59 so as to lower the cutter 26h, thereby cutting the adhesive tape 26g, as shown in FIG. 10.

After the adhesive tape 26g has been cut by the cutter 26h, the support plate 21b and the movable plate 21c are further moved in substantially the horizontal direction and the control unit 40 outputs a drive signal to the adhering member drive means 60 in synchronism therewith so as to lower the reverse L-shaped adhering member 26i. In this state, the unstuck portion of the adhesive tape 26g extends outwardly from the edge portion of the front cover. As shown in FIG. 11, as the adhering member 26i is being lowered, the reverse L-shaped adhering member 26i comes into contact with the opposite surface of the portion of the adhesive tape unstuck on the front cover surface to the adhesive surface and lowers the adhesive tape 26g. At this time, the control unit 40 further outputs a drive signal to the adhering member drive means 60 and rotates the adhering member 26i toward the edge portion of the set of blanks 30 held between the support plate 21b and the movable plate 21c, while it is lowering the adhering member 26i. As a result, as shown in FIG. 12, the adhesive tape 26g is stuck on the edge portion of the set of blanks 30 held between the support plate 21b and the movable plate 21c in such a manner that it covers the edge portion of the set of blanks 30. Further, the support plate 21b and the movable plate 21c are moved in substantially the horizontal direction and when they reach the other end of the set of blanks 30, as shown in FIG. 13, the adhesive tape 26g covers the entire edge portion of the set of blanks 30 held between the support plate 21b and the movable plate 21c and stuck thereon, thereby producing a check book.

After the check book has been produced in this manner, the support plate 21b and the movable plate 21c are further moved in substantially the horizontal direction with the check book held therebetween and the check book is deposited in the take-out box-24. When based upon the time period during which the stacking section drive means 64 has been driven, the control unit 40 judges that the check book has been fed into the take-out box 24, it outputs a drive signal to the shutter drive means 66 for driving the shutter 27 of the take-out box 24 and opens the shutter 27, thereby enabling a customer to take out the check book.

If the check book has not been taken out by the customer by the time that a predetermined time period has passed after the check book was fed into the take-out box 24 and the shutter 27 was opened by the shutter drive means 66, the control unit 40 outputs a reverse drive signal to the stacking section drive means 64, thereby retracting the support plate 21b and the movable plate 21c. Simultaneously the control unit 40 outputs a drive signal to the stopper drive means 61, thereby moving the stopper 27 into the path where the support plate 21b and the movable plate 21c are to be moved.

As a result, the stopper 28 prevents the check book from being retracted and the check book separates from the support plate 21b and the movable plate 21c and is stored in the unreceived check book box 29.

As described above, the customer can obtain a check book produced by binding the front cover, seven checks, the divider paper, three checks and the back cover in this order.

If the customer wants another check book, another check book will be produced only by turning on the start switch again in the same manner as described above.

According to this embodiment, since the check book issuing machine is provided with the read-out section 16 in addition to the MICR character printing section 14 and the dot printer 15, it is possible to judge whether the printing data consisting of the visually unrecognizable MICR characters printed on the surface of the check blank by the MICR character printing section 14 are printed in the desired manner and it is unnecessary to use an independent read-out apparatus for judging whether or not the printing data consisting of the MICR characters are correctly printed on the check after the check is produced. Further, since the machine is provided with the blank stacking section 21, the second aligning member 22, the stapler 25 and the adhering mechanism 26, it is possible to produce and issue a check book including a predetermined number of checks.

Moreover, since the check book issuing machine is provided with the first storing section 1 where check blanks are stored and the second storing section 2 where front covers, divider papers and back covers are stored for issuing a check book formed by binding a front cover, seven checks, a divider paper, three checks and a back cover and is constituted so that the control unit 40 selectively switches the switching means 7 to selectively take out check blanks or a front cover, divider paper or back cover, it is possible to take out the blanks in a desired order so as to produce a check book. Further, since the first storing section 1 and the second storing section 2 are formed so as to be able to store substantially the same number of blanks, in the case where the front covers, divider papers and back covers, which are used in smaller number than the check blanks when check books are made, are not taken out in a desired order or where double feed of these blanks occurs, making it necessary for the blanks taken out from the second storing section 2 to be collected in the collecting box 20 until the desired blank is taken out with no occurrence of double feed, it will still be rare for the front covers, the divider papers and the back covers to run short and have to be replenished before the check blanks. It is therefore possible to efficiently produce and issue check books.

Furthermore, since the check book issuing machine is divided into an upper mechanism and a lower mechanism by the feed direction selector section 17, the check book issuing machine can be made compact.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, although a front cover, seven checks, a divider paper, three checks and a back cover are bound in this order from the top to produce a check book, the number of checks bound between the front cover and the divider paper is not limited to seven, the number of checks bound between the divider paper and the back cover is not limited to three and the number of checks can be arbitrarily selected. Moreover, a divider paper is not always necessary.

Further, in the above described embodiment, although check blanks stored in the first storing section 1 and front covers, divider papers and back covers stored in the second storing section 2 are taken out by a single take-out means 3, independent take-out means can be provided for taking out the check blanks stored in the first storing section 1 and the front covers, divider papers and back covers stored in the second storing section 2.

Furthermore, in the above described embodiment, although the separation rollers 8a, 8b are constituted so as to be rotated to feed blanks into the transporting passage 9 when they are subjected to torque of greater than a predetermined magnitude, the separation rollers 8a, 8b may be held stationary.

Moreover, in the above described embodiment, although the kind of blank is judged by reading out barcode printed on check blanks, front covers, divider papers and back covers by the barcode reader, it is possible to judge the kind of blanks based upon surface characteristics of blanks, for example, by optically reading out surface patterns of the blanks with an optical means.

Further, in the above described embodiment, although the first storing section 1 and the second storing section 2 are provided so that the first storing section 1 stores check blanks and that the second storing-section 2 stores front covers, divider papers and back covers, it is possible to store a plurality sets of blanks in a single storing section, each set of blanks consisting of a front cover, a first predetermined number of check blanks, a divider paper, a second predetermined number of check blanks and a back cover arranged in this order.

Furthermore, in the above described embodiment, although the check book issuing machine is divided into an upper mechanism and a lower mechanism by the feed direction selector section 17 provided downstream of the read-out section 16, the location of the feed direction selector section 17 can be arbitrarily selected depending upon the structure of the check book issuing machine, and the feed direction selector section 17 can be provided upstream of the read-out section 16. Further, the check book issuing machine need not necessarily be divided into the upper mechanism and the lower mechanism and, therefore, the feed direction selector section 17 is not always necessary.

Moreover, in the above described embodiment, although the unreceived check book box 29 is provided for collecting check books which customers did not take, it is possible to notify an operator of the fact that the customer did not take the check book by, for example, sounding a warning when a predetermined time period has passed after the check book was fed into the take-out box 24 so that the operator can collect the check book.

Further, in the above described embodiment, although data are printed on check blanks, front covers, divider papers and back covers by the dot printer 15, if the law and customs allow, the data may be printed thereon by any other printing means than the dot printer 15 and the data need not be printed on some kind of blanks other than check blanks.

Furthermore, in the above described embodiment, although the first storing section 1 and the second storing section 2 are formed so as to be able to store substantially the same number of blanks, if front covers, divider papers and back covers can be reliably stored in the second storing section 2 in a desired order and double feed can be prevented without fail, the sizes of the first storing section 1 and the second storing section 2 can be determined so as to be proportional to the number of blanks necessary for producing a check book.

Moreover, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide a check book issuing machine which can print necessary data on checks, judge whether or not the data are properly printed and issue a check book by binding a predetermined number of checks.

We claim:

1. A check book issuing machine comprising a blank storing means for storing blanks including a plurality of check blanks, front covers and back covers, blank take-out means for taking out blanks stored in the blank storing means two or more times in an order such as a front cover, a predetermined number of check blanks and a back cover, thickness detecting means for detecting the thickness of the blanks taken out by the blank take-out means and outputting detection signals, read-out means for reading out a surface characteristics of the blanks taken out by the blank take-out means and outputting read-out signals, MICR character printing means for printing visually unrecognizable data consisting of MICR characters, printer means for printing visually recognizable predetermined data on a surfaces of at least the check blanks among said blanks, printed data read-out means for reading out data consisting of MICR characters printed on the surfaces of the check blanks by the MICR character printing means, blank stacking and transferring means for stacking a predetermined number of checks, one front cover and one back cover therein and holding the stacked checks, front cover and back cover for transferring them, staple means for binding one end portions of the predetermined number of check blanks, the one front cover and the one back cover stacked in and held between the blank stacking and transferring means, adhering means adapted for sticking an adhesive tape on the one end portions of the predetermined number of check blanks, the one front cover and the one back cover whose one end portions are bound by the stapler means and producing a check book, collecting box means for collecting blanks therein which are not suitable for being stacked in the blank stacking and transferring means, blank transporting means for transporting blanks between the blank storing means, the thickness detecting means, the read-out means, the MICR character printing means, the printer means and the printed data read-out means, and the blank stacking and transferring means and the collecting box means, fork means disposed among the printed data read-out means, the blank stacking and transferring means and the collecting box means and adapted for feeding the blanks to either the blank stacking and transferring means or the collecting box means, and control means for judging based upon the detection signals input from the thickness detecting means whether or not double feed of blanks occurs, judging based upon the read-out signals input from the read-out means whether or not a predetermined blank has been taken out, judging based upon the read-out signals input from the printed data read-out means whether or not print data consisting of the MICR characters have been printed on the check blanks by the MICR character printing means in a desired manner, driving the fork means to thereby feed to the collecting box double fed blanks, any blank other than a predetermined one and any check blank whose surface is not printed with the print data consisting of the MICR characters by the MICR character printing means in a desired manner, causing the blank stacking and transferring means to hold the predetermined number of check blanks, the one front cover and the one back cover when the predetermined number of check blanks, the one front cover and the one back cover have been stacked in the blank stacking and transferring means, causing the stapler means to bind one end portions of the predetermined number of check blanks, the one front cover and the one back cover held by the blank stacking and transferring means, causing the blank stacking and transferring means to transfer the predetermined number of check blanks, the one front cover and the one back cover to the adhering means, causing the adhering means to stick an adhesive tape on one end portions thereof so as to produce a check book and causing the blank stacking and transferring means to feed out the thus produced check book into take-out box means.

2. A check book issuing machine in accordance with claim 1 wherein the blanks further include a plurality of divider papers and wherein the blank take-out means is adapted for taking out the blanks stored in the blank storing means two or more times in an order such as the front cover, a first predetermined number of check blanks, the divider paper, a second predetermined number of check blanks and the back cover.

3. A check book issuing machine in accordance with claim 2 wherein the blank storing means comprises first storing means for storing a plurality of check blanks and a second storing means for storing a plurality of front covers, divider papers and back covers.

4. A check book issuing machine in accordance with claim 1 wherein the blank stacking and transferring means comprises a support plate disposed in substantially the horizontal plane, a movable plate movable with respect to the support plate and a side plate having a surface substantially parallel to the transporting direction of blanks, and wherein stacked blank aligning means is further provided below the support plate and adapted for projecting through an opening formed in the support plate to above the support plate so as to contact the lower surface of a fed-in blank and aligning the blank by moving it until it comes into abutment against the side plate.

5. A check book issuing machine in accordance with claim 2 wherein the blank stacking and transferring means comprises a support plate disposed in substantially the horizontal plane, a movable plate movable with respect to the support plate and a side plate having a surface substantially parallel to the transporting direction of blanks, and wherein stacked blank aligning means is further provided below the support plate and adapted for projecting through an opening formed in the support plate to above the support plate so as to contact the lower surface of a fed-in blank and aligning the blank by moving it until it comes into abutment against the side plate.

6. A check book issuing machine in accordance with claim 3 wherein the blank stacking and transferring means comprises a support plate disposed in substantially the horizontal plane, a movable plate movable with respect to the support plate and a side plate having a surface substantially parallel to the transporting direction of blanks, and wherein stacked blank aligning means is further provided below the support plate and adapted for projecting through an opening formed in the support plate to above the support plate so as to contact the lower surface of a fed-in blank and aligning the blank by moving it until it comes into abutment against the side plate.

7. A check book issuing machine in accordance with claim 4 wherein the control means is adapted for causing the stacked blank aligning means to project through the opening to above the support plate when a blank is fed into the blank stacking and transferring means, retracting the same from the opening to below the support plate before the blank abuts against the blank stacking and transferring means and causing the stacked blank aligning means to project through the opening to above the support plate after the blank has passed through the opening.

8. A check book issuing machine in accordance with claim 5 wherein the control means is adapted for causing the stacked blank aligning means to project through the opening to above the support plate when a blank is fed into the blank stacking and transferring means, retracting the same from the opening to below the support plate before the blank abuts against the blank stacking and transferring means and causing the stacked blank aligning means to project through the opening to above the support plate after the blank has passed through the opening.

9. A check book issuing machine in accordance with claim 6 wherein the control means is adapted for causing the stacked blank aligning means to project through the opening to above the support plate when a blank is fed into the blank stacking and transferring means, retracting the same from the opening to below the support plate before the blank abuts against the blank stacking and transferring means and causing the stacked blank aligning means to project through the opening to above the support plate after the blank has passed through the opening.

10. A check book issuing machine in accordance with claim 1 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

11. A check book issuing machine in accordance with claim 2 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

12. A check book issuing machine in accordance with claim 3 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

13. A check book issuing machine in accordance with claim 4 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

14. A check book issuing machine in accordance with claim 5 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

15. A check book issuing machine in accordance with claim 6 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

16. A check book issuing machine in accordance with claim 7 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

17. A check book issuing machine in accordance with claim 8 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

18. A check book issuing machine in accordance with claim 9 which further includes feed direction selector means provided downstream of the printed data read-out means for changing the feed direction of blanks and wherein the blank transporting means is adapted for transporting the blanks in substantially the horizontal direction between the blank storing means and the printed data read-out means, the feed direction selector means being adapted for transporting the blanks downwardly in substantially the vertical direction.

19. A check book issuing machine in accordance with claim 1 which further includes unreceived check book collecting box means provided below the take-out box means and wherein the .control means is adapted for causing the unreceived check book collecting box means to collect the check book in the unreceived check book collecting box means if the check book is not taken out from the take-out box means by the time that a predetermined time period has passed after the check book was fed into the collecting box means.

20. A check book issuing machine in accordance with claim 2 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

21. A check book issuing machine in accordance with claim 3 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

22. A check book issuing machine in accordance with claim 4 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

23. A check book issuing machine in accordance with claim 5 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

24. A check book issuing machine in accordance with claim 6 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

25. A check book issuing machine in accordance with claim 7 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

26. A check book issuing machine in accordance with claim 8 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

27. A check book issuing machine in accordance with claim 9 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

28. A check book issuing machine in accordance with claim 10 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

29. A check book issuing machine in accordance with claim 11 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

30. A check book issuing machine in accordance with claim 12 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

31. A check book issuing machine in accordance with claim 13 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

32. A check book issuing machine in accordance with claim 14 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

33. A check book issuing machine in accordance with claim 15 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

34. A check book issuing machine in accordance with claim 16 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

35. A check book issuing machine in accordance with claim 17 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

36. A check book issuing machine in accordance with claim 18 which further includes unreceived check book collecting box means provided below the take-out box means and wherein the control means is adapted for causing the unreceived check book collecting box means to collect the check book in the unreceived check book collecting box means if the check book is not taken out from the take-out box means by the time that a predetermined time period has passed after the check book was fed into the collecting box means.

* * * * *

UNITED STATES PATENT AND TRADEMARK OFFICE
CERTIFICATE OF CORRECTION

PATENT NO.    : 5,354,161

DATED         : October 11, 1994

INVENTOR(S)   : CHIBA et al

It is certified that error appears in the above-identified patent and that said Letters Patent is hereby corrected as shown below:

On the title page, item [75]:

Please add the following inventor:

Masaaki Hanata

Signed and Sealed this

Fourteenth Day of November, 1995

Attest:

BRUCE LEHMAN

*Attesting Officer*    *Commissioner of Patents and Trademarks*